(12) United States Patent
Broadfoot et al.

(10) Patent No.: US 8,471,847 B1
(45) Date of Patent: Jun. 25, 2013

(54) USE OF CONSTRUCTED THREE-DIMENSIONAL GEOMETRIES TO EFFICIENTLY REPRESENT TIME VARYING CARTESIAN DATA

(75) Inventors: Chris Broadfoot, Forest Lodge (AU); James McGill, Forest Lodge (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/455,978

(22) Filed: Apr. 25, 2012

Related U.S. Application Data

(60) Provisional application No. 61/605,142, filed on Feb. 29, 2012.

(51) Int. Cl.
*G06T 15/00* (2011.01)

(52) U.S. Cl.
USPC ............ 345/419; 345/424; 345/441; 345/443

(58) Field of Classification Search
USPC .................................. 345/419, 441, 443, 424
See application file for complete search history.

(56) References Cited

U.S. PATENT DOCUMENTS

| | | | | |
|---|---|---|---|---|
| 7,034,825 B2 * | 4/2006 | Stowe et al. | .................. | 345/423 |
| 7,180,516 B2 * | 2/2007 | Kapler et al. | .................. | 345/418 |
| 7,250,944 B2 * | 7/2007 | Anderson et al. | ............. | 345/419 |
| 7,499,046 B1 * | 3/2009 | Wright et al. | .................. | 345/418 |
| 7,538,764 B2 * | 5/2009 | Salomie | ......................... | 345/420 |
| 7,609,257 B2 * | 10/2009 | Wright et al. | .................. | 345/419 |
| 7,710,418 B2 * | 5/2010 | Fairclough | ..................... | 345/426 |
| 2006/0209061 A1 | 9/2006 | Burch et al. | | |

OTHER PUBLICATIONS

Kjellin et al. "Evaluating 2D and 3D visualizations of Spatialtemporal Information". ACM 2010.*
Binotto et al., "Real-Time Volume Rendering of Time-Varying Data Using a Fragment-Shader Compression Approach", IEEE Symposium on Parallel and Large-Data Visualization and Graphics, Oct. 21, 2003, pp. 69-75.
Thakur et al., "A 3D Visualization of Multiple Time Series on Maps", 2010 14th International Conference Information Visualisation, IEEE Computer Society, Jul. 26-29 2010, pp. 336-343.
Tominski et al., "3D Information Visualization for Time Dependent Data on Maps", Ninth International Conference on Information Visualisation, 2005 Proceedings, Jul. 6-8 2005, pp. 175-181.

* cited by examiner

*Primary Examiner* — Kimbinh T Nguyen
(74) *Attorney, Agent, or Firm* — McDermott Will & Emery LLP

(57) ABSTRACT

A computing device configured to render time-varying geographic data or other Cartesian data, for example on a map. The computing device includes a memory device, and processing hardware configured to access, from the memory device, data defining a three-dimensional object representing time-varying geographic data, the three-dimensional object defined in a three-dimensional coordinate space; to determine a two-dimensional plane in the three-dimensional coordinate space, the two-dimensional plane corresponding to a time value of interest; and to render, on a map, a shape defined by an intersection of the two-dimensional plane with the three-dimensional object.

19 Claims, 15 Drawing Sheets

USE OF CONSTRUCTED THREE-DIMENSIONAL GEOMETRIES TO EFFICIENTLY REPRESENT TIME VARYING CARTESIAN DATA

CROSS-REFERENCE TO RELATED APPLICATION

This application claims the benefit of U.S. Provisional Patent Application No. 61/605,142, filed Feb. 29, 2012, entitled "USE OF CONSTRUCTED THREE-DIMENSIONAL GEOMETRIES TO EFFICIENTLY REPRESENT TIME VARYING CARTESIAN DATA," the disclosure of which is hereby incorporated by reference in its entirety for all purposes.

BACKGROUND

The present disclosure generally relates to representing time varying Cartesian data with three-dimensional geometries.

Viewing time varying Cartesian data as a function of time can be very useful. For example, someone may have data points for a number of people in each building in a city as a function of time. For another example, someone may have data points for vehicles moving in a city as a function of time. In both of these examples, it might be very useful to view an animation of the data showing how the data varies over time.

One method of displaying the data would be to process and display each data point separately. Thus, the visual display would be updated each time a data point representing some item changed. Visually displaying the data in this manner can be very CPU intensive, especially for large data sets. Problems also can arise if the data points do not align temporally, if varying intervals occur between data points in a data set, and for other reasons.

SUMMARY

According to one aspect of the present disclosure, a computing device is configured to render time-varying geographic data on a map. The computing device includes a memory device and processing hardware. The processing hardware is configured to access, from the memory device, data defining a three-dimensional object representing time-varying geographic data, the three-dimensional object defined in a three-dimensional coordinate space; to determine a two-dimensional plane in the three-dimensional coordinate space, the two-dimensional plane corresponding to a time value of interest; and to render, on a map, a shape defined by an intersection of the two-dimensional plane with the three-dimensional object.

According to another aspect of the present disclosure, a computing device is configured to provide time-varying geographic data to be rendered on a map. The computing device includes a memory device and processing hardware. The processing hardware is configured to access, from the memory device, data defining a series of data points that vary over a time interval, the series of data points associated with a series of geographic coordinates; and to generate a three-dimensional object having a profile along an axis, the profile varying along the axis based on the series of data points.

According to another aspect of the present disclosure, a computer implemented method of rendering time-varying geographic data on a map is provided. The method includes the steps of accessing data defining a plurality of three-dimensional objects representing time-varying geographic data, the three-dimensional objects defined in a three-dimensional coordinate space; determining a two-dimensional plane in the three-dimensional coordinate space, the two-dimensional plane corresponding to a time value of interest; and rendering, on a map, a plurality of shapes defined by an intersection of the two-dimensional plane with the three-dimensional objects.

According to a further aspect of the present disclosure, a computer implemented method of providing time-varying geographic data to be rendered on a map is provided. The method includes the steps of accessing data defining a plurality of series of data points that vary over a time interval, the plurality of series of data points associated with a series of geographic coordinates; and generating a plurality of three-dimensional objects having a plurality of profiles along an axis, the plurality of profiles varying along the axis based on the plurality of series of data points.

According to an additional aspect of the present disclosure, a machine-readable storage medium is provided that includes machine-readable instructions for causing a processor to execute a method of rendering time-varying Cartesian data. The method includes the steps of accessing data defining a plurality of three-dimensional objects representing time-varying Cartesian data, the three-dimensional objects defined in a three-dimensional coordinate space; determining a two-dimensional plane in the three-dimensional coordinate space, the two-dimensional plane corresponding to a time value of interest; and rendering a plurality of shapes defined by an intersection of the two-dimensional plane with the three-dimensional objects.

According to a further aspect of the invention, a machine-readable storage medium is provided that includes machine-readable instructions for causing a processor to execute a method of providing time-varying Cartesian data to be rendered. The method includes the steps of accessing data defining a plurality of series of data points that vary over a time interval, the plurality of series of data points associated with a series of Cartesian coordinates; and generating a plurality of three-dimensional objects having a plurality of profiles along an axis, the plurality of profiles varying along the axis based on the plurality of series of data points.

This disclosure is not limited to the foregoing aspects.

BRIEF DESCRIPTION OF THE DRAWINGS

The accompanying drawings, which are included to provide further understanding and are incorporated in and constitute a part of this disclosure, illustrate disclosed embodiments and together with the description serve to explain the principles of the disclosed embodiments. In the drawings.

DETAILED DESCRIPTION

Figure 1:
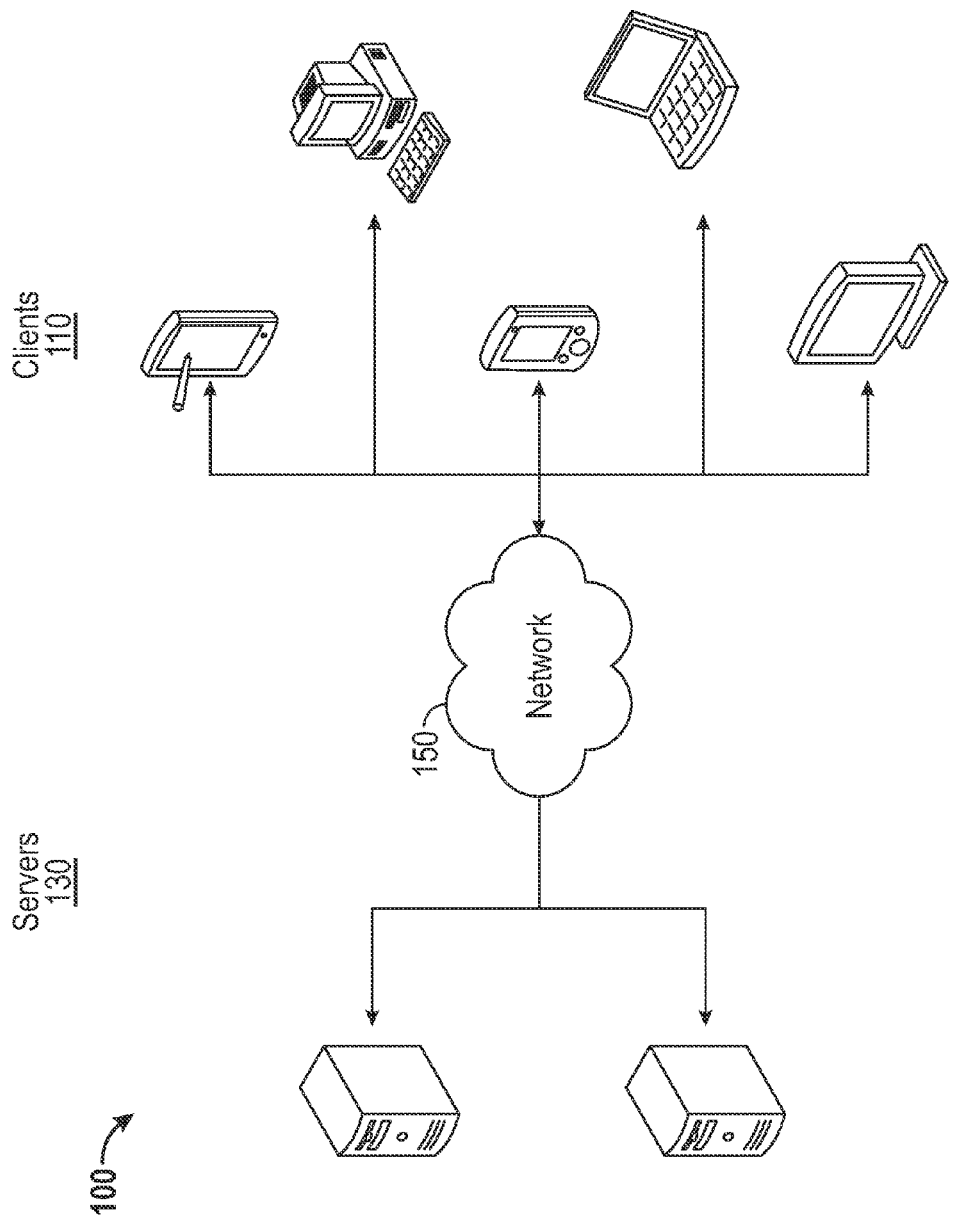
FIG. 1 illustrates an example of an architecture for rendering time-varying geographic data and for providing time-varying geographic data to be rendered according to certain aspects of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

One aspect of the subject technology facilitates modeling and rendering of time varying Cartesian data by modeling the data as one or more constructed three-dimensional objects. Two coordinates of the objects can be mapped to a two-dimensional spatial coordinate, for example a geographic location. A third coordinate can be mapped to represent time. For ease of reference, the two coordinates mapped to the two dimensional spatial coordinate are referred to as the x and y coordinates along x and y axes in this disclosure, and the third coordinate mapped to represent time is referred to as the z coordinate along a z axis. The third coordinate can also be referred to as at coordinate, which in turn can be mapped to time. Using this convention, a position of a plane perpendicular to the z axis (i.e., a z plane) across the objects acts as a proxy for time.

Each object can be constructed such that the object's profile sliced in a plane of a z coordinate gives a symbolic two-dimensional representation of the data to be displayed. In one technique of displaying the data, orthographic projections can be made of the object(s) sliced at different z coordinates. Changing z near/far clip values of the projections can be used to animate through the entire dataset.

One possible advantage of the foregoing approach is that fast animation of the data can be achieved without having to re-buffer geometry. Instead, the three-dimensional objects representing the dataset can be buffered once and then processed. Of course, re-buffering can be used if so desired, for example to change or update the dataset.

Another possible advantage of the foregoing approach is that an object representing data points for an item of interest can be placed to exist only along certain t coordinates in a three-dimensional space. In an animation based on objects in that space, rendered shapes representing those data points could appear, change, and then disappear depending on the object's shape and t coordinates. For example, if an object existed only between t coordinates t1 and t2 in a three-dimensional space that spanned t0<t1 to t3>t2, shapes rendered based on that object in an animation generated from objects in the entire three-dimensional space could appear at time t1, change between times t1 and t2 based on the object's shape, and disappear at time t2. This ability to control where and how data is represented in an animation can help to create a clearer and potentially more impactful visual presentation of the data.

This disclosure is not limited to approaches that achieve the foregoing advantages.

FIG. 1 illustrates an example of an architecture for rendering time-varying geographic data on a map and for providing time-varying geographic data to be rendered on a map according to certain aspects of the disclosure.

The architecture 100 includes servers 130 and clients 110 connected over a network 150. One of the many clients 110 or servers 130 communicating over network 150 is configured to host computer implemented methods of rendering time-varying geographic data on a map and/or providing time-varying geographic data to be rendered on a map according to certain aspects of the disclosure. For purposes of load balancing, multiple clients 110, servers 130, or some combination of clients 110 and servers 130 can host these methods or portions thereof. In an alternative approach, a computing device may be configured as both a client and a server (i.e. self-serving).

The clients 110 and servers 130 can be any device having a processor, memory, and communications capability for generating and rendering data as disclosed herein. The clients 110 to which the servers 130 are connected over the network 150 can be, for example, desktop computers, mobile computers, tablet computers (including, but not limited to, e-book readers), mobile devices (e.g., smartphones or personal digital assistants), set top boxes (e.g., computers adapted for use with or integrated into a television), video game consoles, or any other devices having processing, memory, and communications capabilities for interacting with content.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
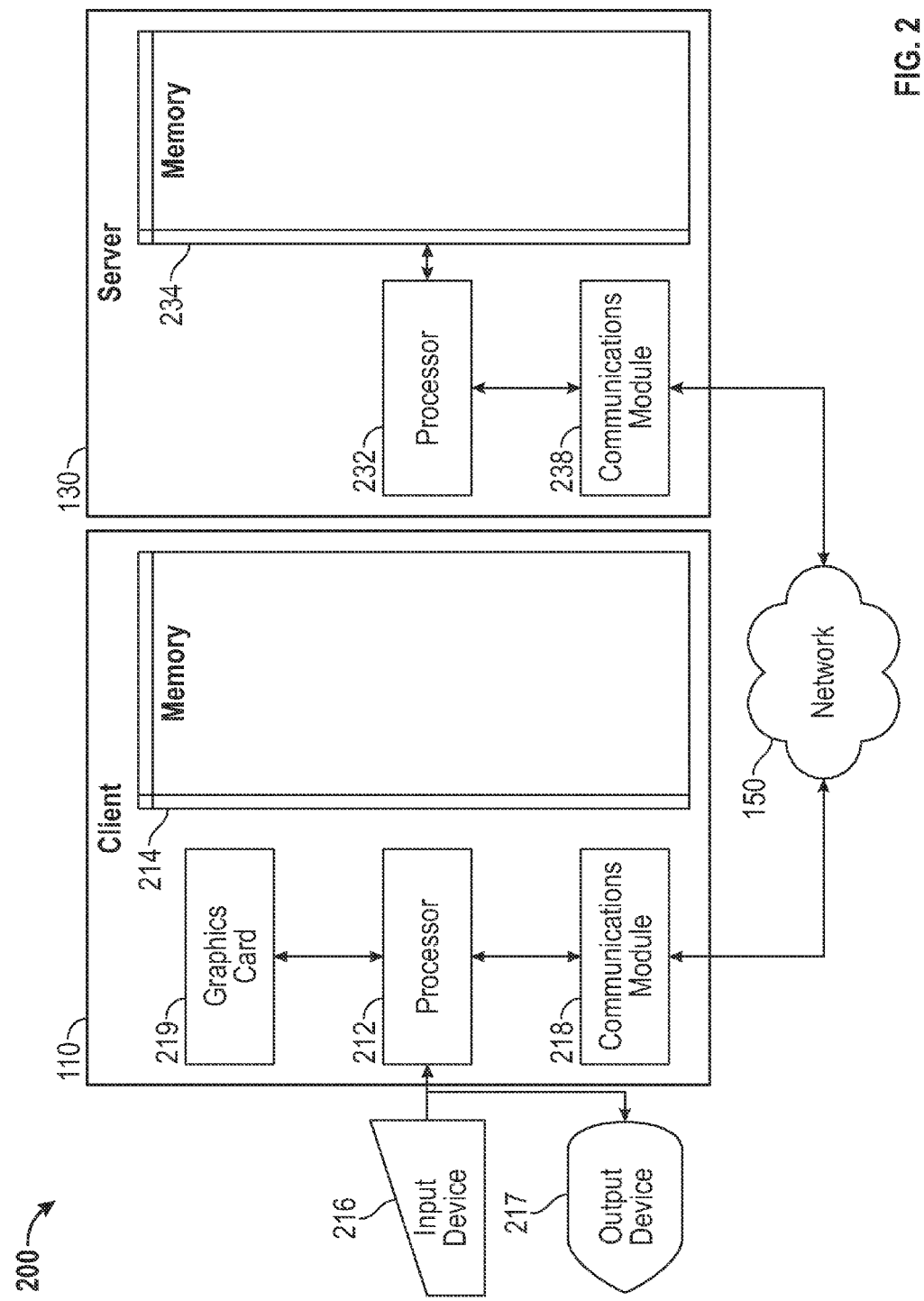
FIG. 2 is a block diagram illustrating examples of a client and a server from the architecture of FIG. 1 according to certain aspects of the disclosure.

FIG. 2 is a block diagram 200 illustrating examples of server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

Both client 110 and server 130 can include processing hardware and some form of memory. In FIG. 2, client 110 includes processor 212 and memory 214, and server 130 includes processor 232 and memory 234. Memory 212 and 234 can be volatile or non-volatile memory. Client 110 also can includes input device 216 and output device 217 for accepting input from and providing output to a user.

Client 110's processing hardware can include one or more graphics cards such as graphics card 219. A graphics card can speed processing and rendering of two-dimensional shapes and three-dimensional objects. Many graphics cards are particularly adept at manipulating two-dimensional shapes and three-dimensional objects as described in this disclosure. However, this disclosure is not limited to clients that include a graphics card such as graphics card 219. Server 130 also can include one or more graphics cards.

Figure 3:
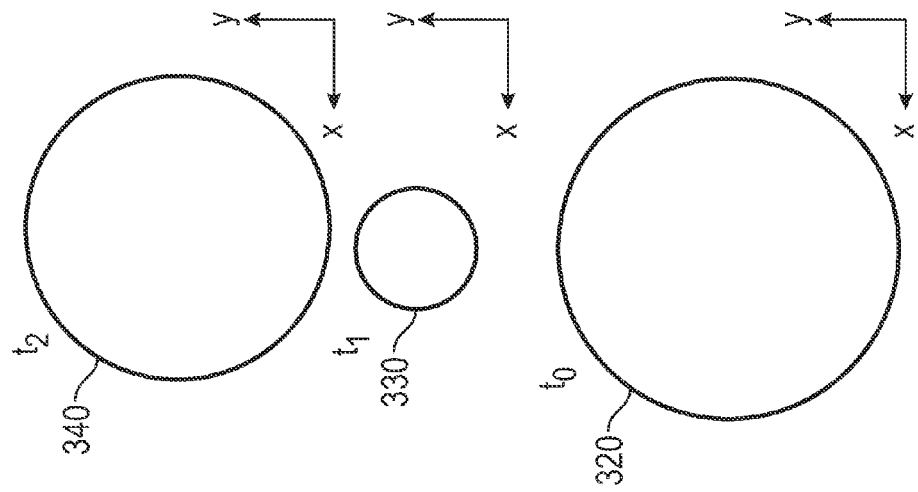
FIG. 3 is an illustration of a three-dimensional object used to model time varying Cartesian data according to certain aspects of the disclosure.
Figure 3:
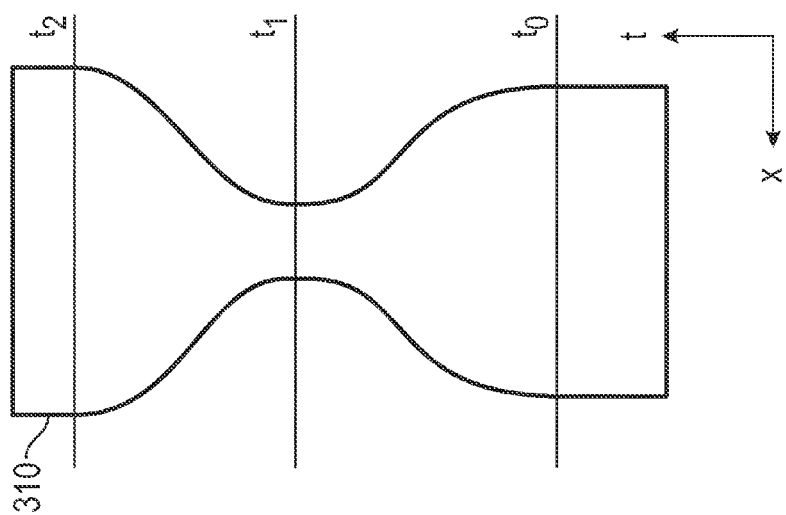

The computing devices shown in FIGS. 1 and 2 or other computing devices can be used to model and render time varying Cartesian data as three-dimensional objects. FIG. 3 is an illustration of such a three-dimensional object according to certain aspects of the disclosure. Three-dimensional object 310 models Cartesian data in the x-y plane varying along time axis t. Cross sections 320, 330, and 340 in the form of circles show this data at times t0, t1, and t2, respectively. The size of the cross section, for example the radius, diameter, circumference, or area of the circles, are related to the data.

Cross sections could also be taken at other times, for example between t0 and t1, to show the data or interpolations of the data at those times. The cross sections do not have to be taken at times that match data used to generate the object. Rather, the data can be used to generate the object, and then cross sections can be taken at any desired time or spacing.

For example, if the data included a magnitude of some variable at a physical location, then object 310 could be placed at x-y coordinates representing that location in the three-dimensional space. The shape of object 310 could be generated by rotating a magnitude-time plot of the variable around the plot's t axis. The object could be used to generate an animation by rendering cross sections of the object at successive t coordinates. This rendering could provide a useful way to view the data. Other techniques for deriving a shape of objects such as object 310 from time varying data also can be used.

Use of three-dimensional objects such as the one shown in FIG. 3 to model data can provide the advantages discussed above, namely fast animation of the data without re-buffering and an ability to control where and how the data appears in an animation based on the object. Of course, the illustrated approach may not always achieve these advantages, and the technology discussed in this disclosure is not limited to instances that do so.

Figure 4:
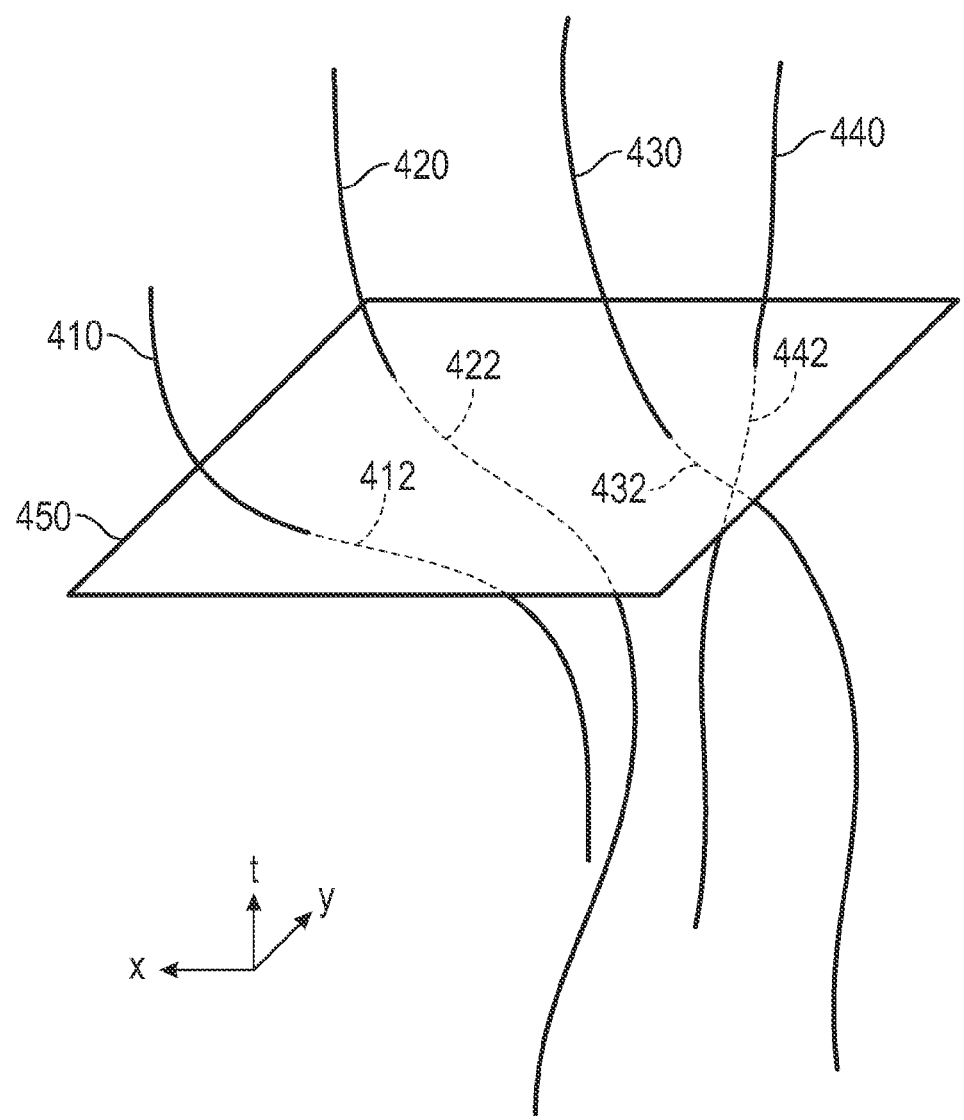
FIG. 4 is an illustration of a plurality of lines in three dimensional space used to model time varying Cartesian data according to certain aspects of the disclosure.

FIG. 4 is an illustration of a plurality of space curves (i.e., objects similar to a line but which are not required to be straight and are in three dimensional space) that can be used to model time varying Cartesian data according to certain aspects of the disclosure. Space curves 410, 420, 430, and 440 are objects modeling data in the x-y plane across time t, as indicated by the axes shown in the figure. Space curves are shown here, but even lines could be used. While lines/curves are not physical objects, these lines are mathematical objects in that they traverse a three dimensional space. Technically speaking, lines and curves have no width, but practically speaking they can be treated as 3D objects like the 3D objects of the other examples herein, with the intersection of a plane with each line or curve resulting in a point in the plane.

Plane 450 at a particular time along the t axis intersects space curves 410, 420, 430, and 440 at points 412, 422, 432, and 442, respectively. The points of intersection represent some Cartesian data at that time, for example a geographic location of a vehicle or other object of interest. A different plane at a different time may intersect the space curves at different points representing the data at that time.

Figure 5:
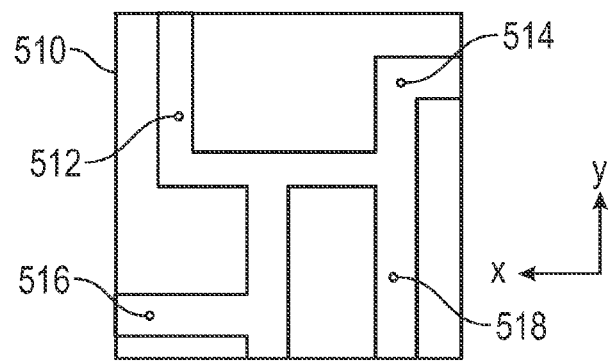
FIG. 5 is an illustration of time varying Cartesian data rendered on a map according to certain aspects of the disclosure.
Figure 5:
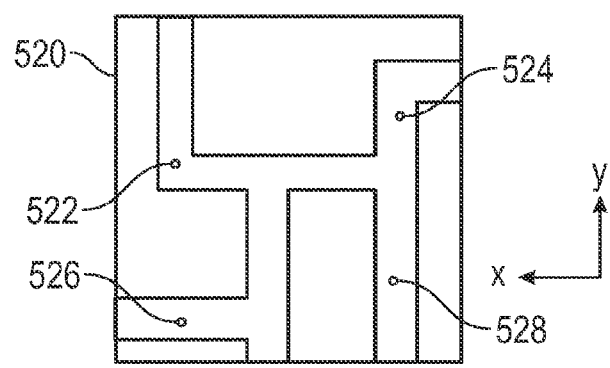
Figure 5:
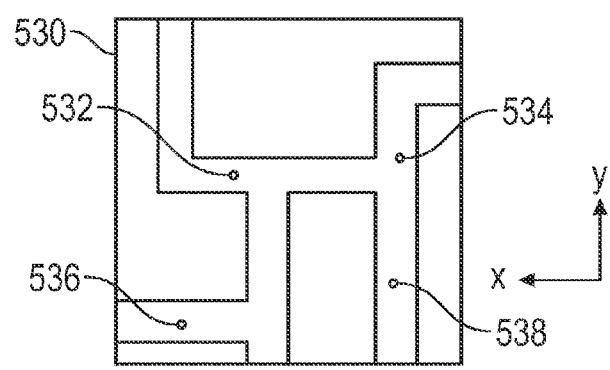

FIG. 5 is an illustration of time varying Cartesian data rendered on a map according to certain aspects of the disclosure. The present technology is not limited to rendering data on a map, but doing so can be useful especially in a case that the Cartesian data includes geographic data.

Views 510, 520, and 530 include a graphical representation of a map. Rendered spots 512, 522, and 532 in views 510, 520, and 530 show a geographic location of some object of interest moving along the map at three different times. For example, these spots could correspond to data represented by line 420 in FIG. 4 intersected by three planes along the t axis. Geographic data for locations of other objects of interest are illustrated by rendered spots 514, 524, and 534 for an object, rendered spots 516, 526, and 536 for an object, and rendered spots 518, 528, and 538 for an object.

Views 510, 520, and 530 can be frames in an animation of the time varying data. Various techniques for enhancing the animation can be used. Examples include but are not limited to blurring effects, persistence of rendered spots, varying brightness of rendered spots, fade-in/fade-out and the like. For example, each object in FIG. 4 has a beginning, a middle, and an end. A brightness of a rendered spot could be dependent upon which of these parts of the corresponding object is being rendered.

The approach illustrated by FIGS. 4 and 5 uses a number and type of three-dimensional objects different from the approach illustrated by FIG. 3. The approach illustrated by FIGS. 4 and 5 also can provide the benefits of fast animation of the data without re-buffering and an ability to control where and how the data appears in an animation. Again, the illustrated approach may not always achieve these advantages, and the technology discussed in this disclosure is not limited to instances that do so.

Figure 6:
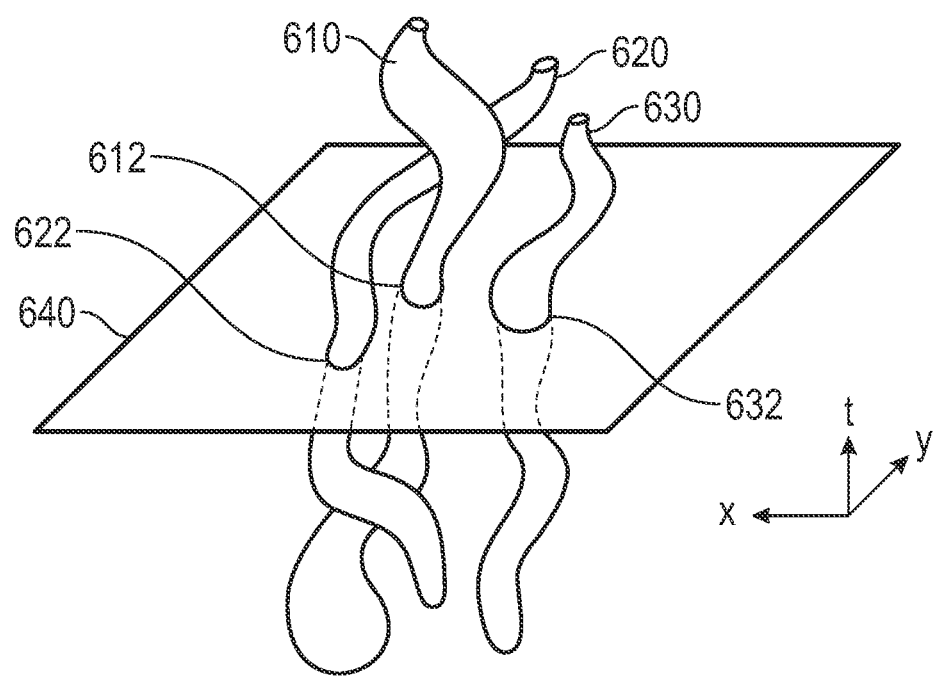
FIG. 6 is an illustration of a plurality of objects in three dimensional space used to model time varying Cartesian data according to certain aspects of the disclosure.

FIG. 6 is an illustration of a plurality of objects in three dimensional space used to model time varying Cartesian data according to certain aspects of the disclosure. This figure shows one technique for combining the models illustrated by FIGS. 3 and 4. Each object 610, 620, and 630 both traverses a three-dimensional space and has a varying size across its length. Thus, these type of objects can model time varying Cartesian data including a location and some other related data, for example a speed of an object such as a car at that location.

Objects according to the disclosure can be modeled as hollow or solid forms. Any other type of three-dimensional model can be used.

The radius, diameter, circumference, area, or any other aspect of the size of the objects at a particular location along the t axis can be used to represent data. In addition, the objects are not limited to having circular cross sections. For example, the objects could have polygonal or free-from cross sections. The types of cross sections also could be used to model additional data, with a particular shape corresponding to some piece of data.

Figure 7:
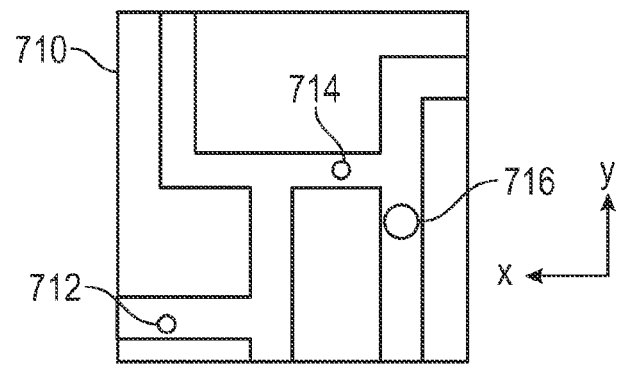
FIG. 7 is an illustration of time varying Cartesian data rendered on a map according to certain aspects of the disclosure.
Figure 7:
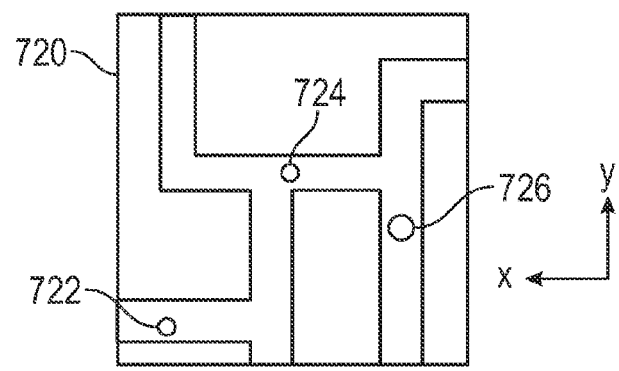
Figure 7:
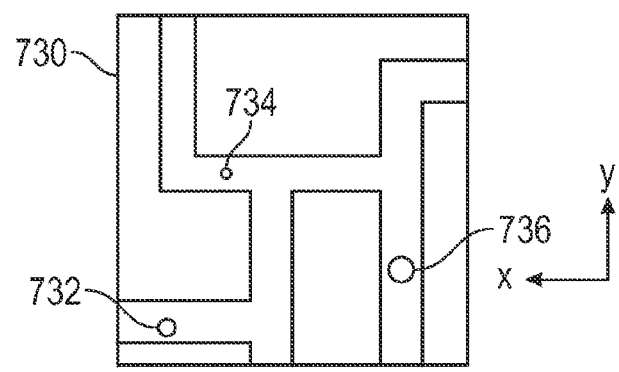

FIG. 7 is an illustration of time varying Cartesian data rendered on a map according to certain aspects of the disclosure. Views 710, 720, and 730 include a graphical representation of a map. Rendered shapes 712, 722, and 732 in views 710, 720, and 730 show a geographic location of some object of interest moving along the map at three different times. For example, these spots could correspond to data represented by object 620 in FIG. 6 intersected by three planes along the t axis. Geographic data for locations of other objects of interest are illustrated by rendered shapes 714, 724, and 734 for an object and rendered shapes 716, 726, and 736 for an object.

The rendered shape in FIG. 7 have varying sizes corresponding to different sizes of the modeled objects at different positions along the t axis. These different sizes in turn can correspond to time varying data in addition to location, for example time varying speed data at different times and locations.

Another technique of representing such additional data includes using different colors for rendering the spots or shapes. For example, red could represent a speed below a certain threshold, green could represent a speed above another threshold, and yellow could represent a speed between the two thresholds. Other techniques for representing additional data also can be used.

Views 710, 720, and 730 can be frames in an animation of the time varying data. Various techniques for enhancing the animation can be used as discussed above.

The foregoing rendering techniques are not limited to rendering data regarding physical objects. For example, the objects can be used to render seismographic data for epicenters of earthquakes over a geography. A presence of an object at a particular time and location in the three-dimensional space could indicate an epicenter of an earthquake at that location, and a size of a cross section of the object can correspond to a magnitude of the Richter scale reading at the epicenter. When rendered on a map, a growing and then disappearing shape would indicate the beginning and end of an earthquake. Movement of the shape would represent movement of the earthquake's epicenter. Other types of data also can be modeled.

Figure 8:
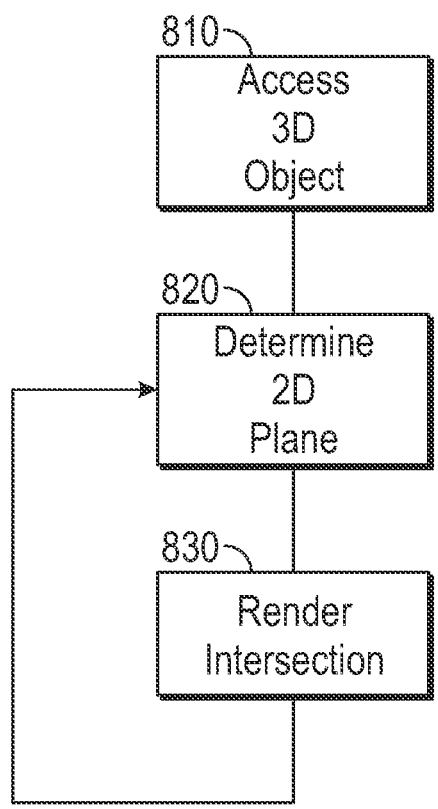
FIG. 8 is a flowchart illustrating a method of rendering time varying Cartesian data using three-dimensional objects according to certain aspects of the disclosure.

FIG. 8 is a flowchart illustrating a method of rendering time varying Cartesian data, namely geographic data, using one or more objects in three-dimensional space according to certain aspects of the disclosure.

Briefly, a computing device such as those shown in FIGS. 1 and 2 can be configured to render time-varying geographic data on a map, for example as discussed above with respect to FIGS. 3 to 8. One technique of doing so includes configuring a computing device's processing hardware to access, from a memory device, data defining a three-dimensional object representing time-varying geographic data, with the three-dimensional object defined in a three-dimensional coordinate space. The processing hardware can be further configured to determine a two-dimensional plane in the three-dimensional coordinate space, with the two-dimensional plane corresponding to a time value of interest, and to render, on a map, a shape defined by an intersection of the two-dimensional plane with the three-dimensional object.

Thus, in step 810, a three-dimensional object defined in a three-dimensional coordinate space is accessed. A two-dimensional plane representing a time value of interest is determined in step 820, and an intersection between the plane and the object is rendered in step 830. The rendering can be overlaid on a map to illustrate a location of time varying geographic data.

Steps 820 and 830 are repeated in order to render multiple successive images, thereby creating an animation of the data. Various controls for manipulating the animation can be provided to a user, permitting great flexibility in viewing the data.

Figure 9:
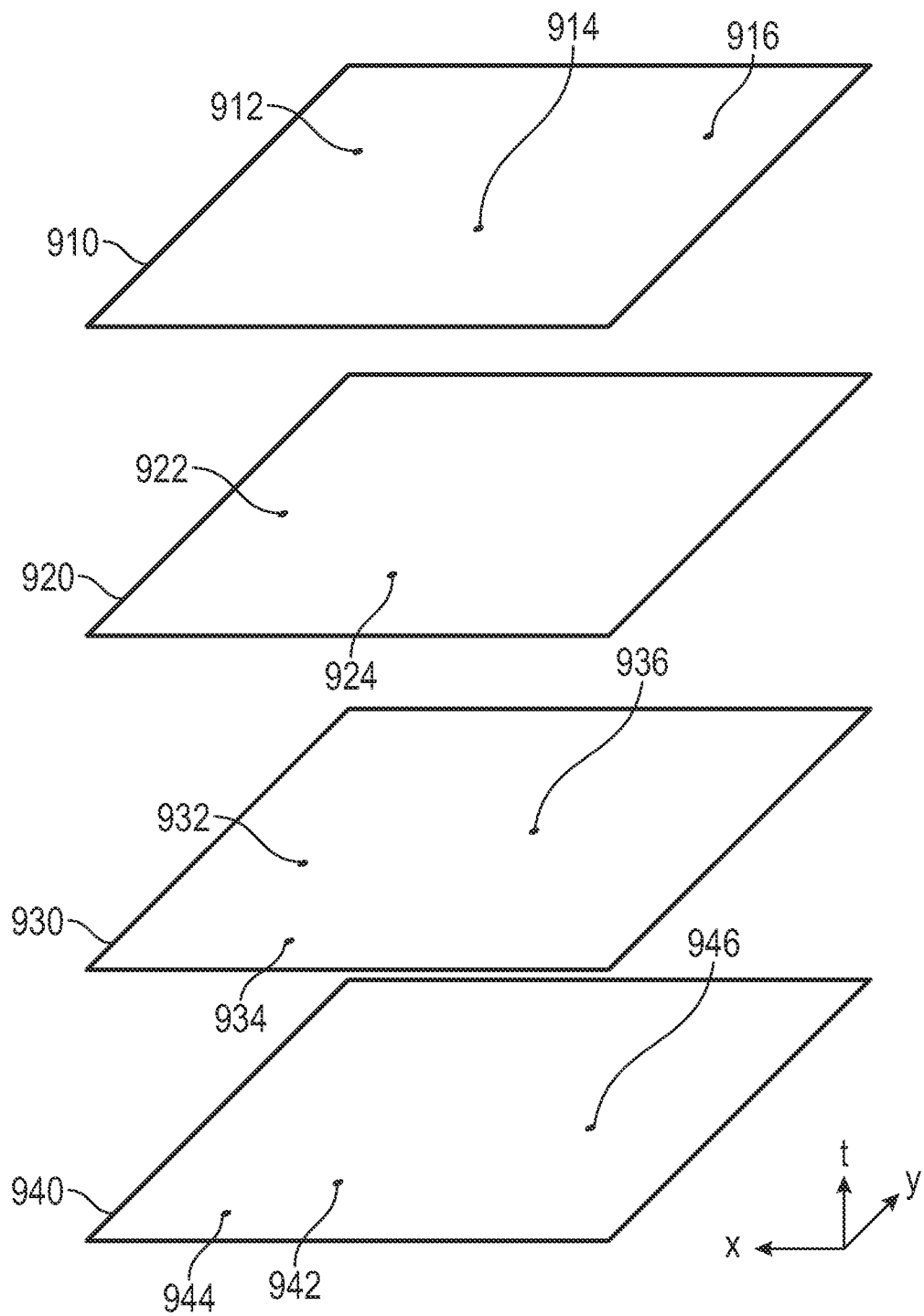
FIGS. 9 to 11 are illustrations of generating three-dimensional objects to model time varying Cartesian data according to certain aspects of the invention.
Figure 10:
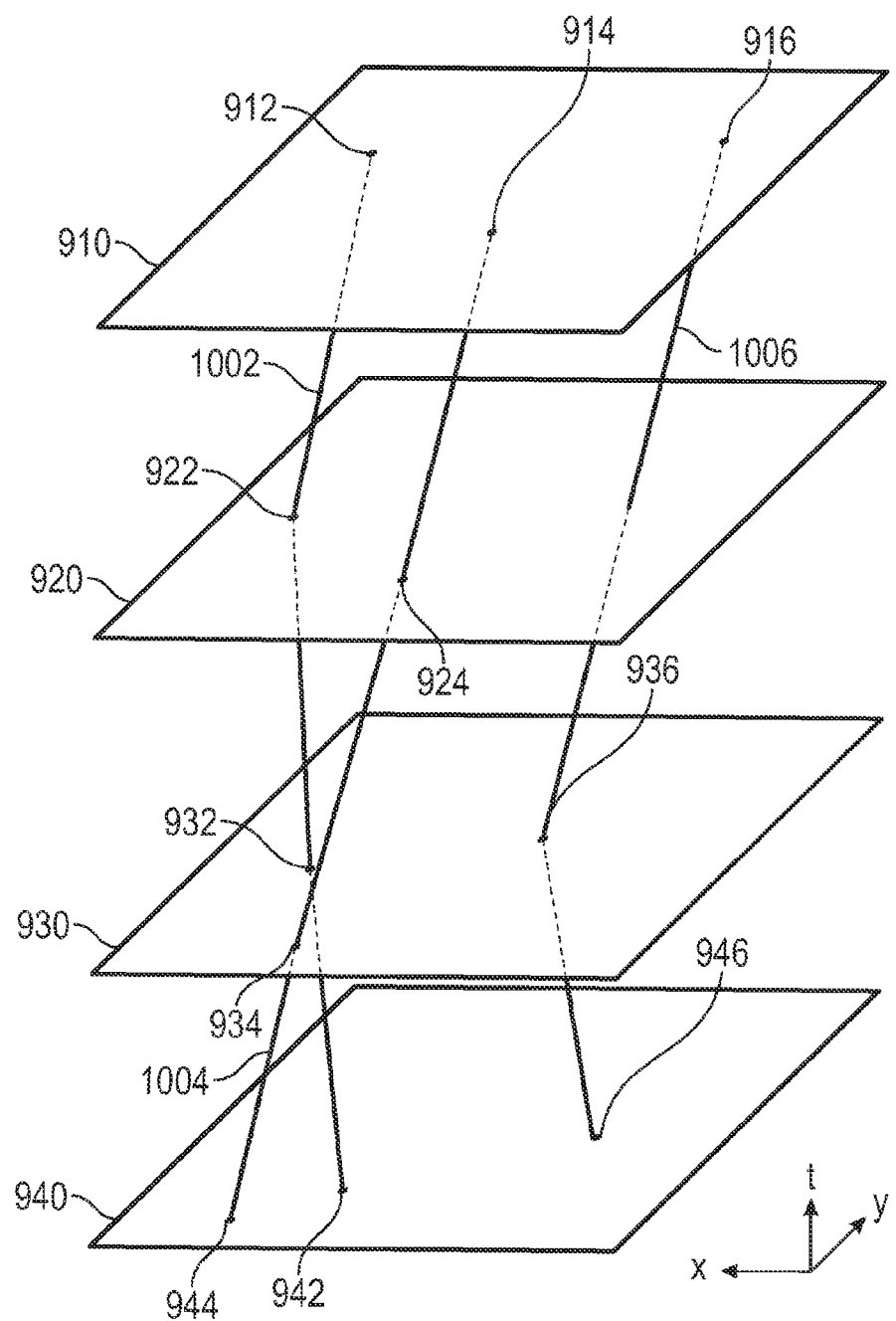
Figure 11:
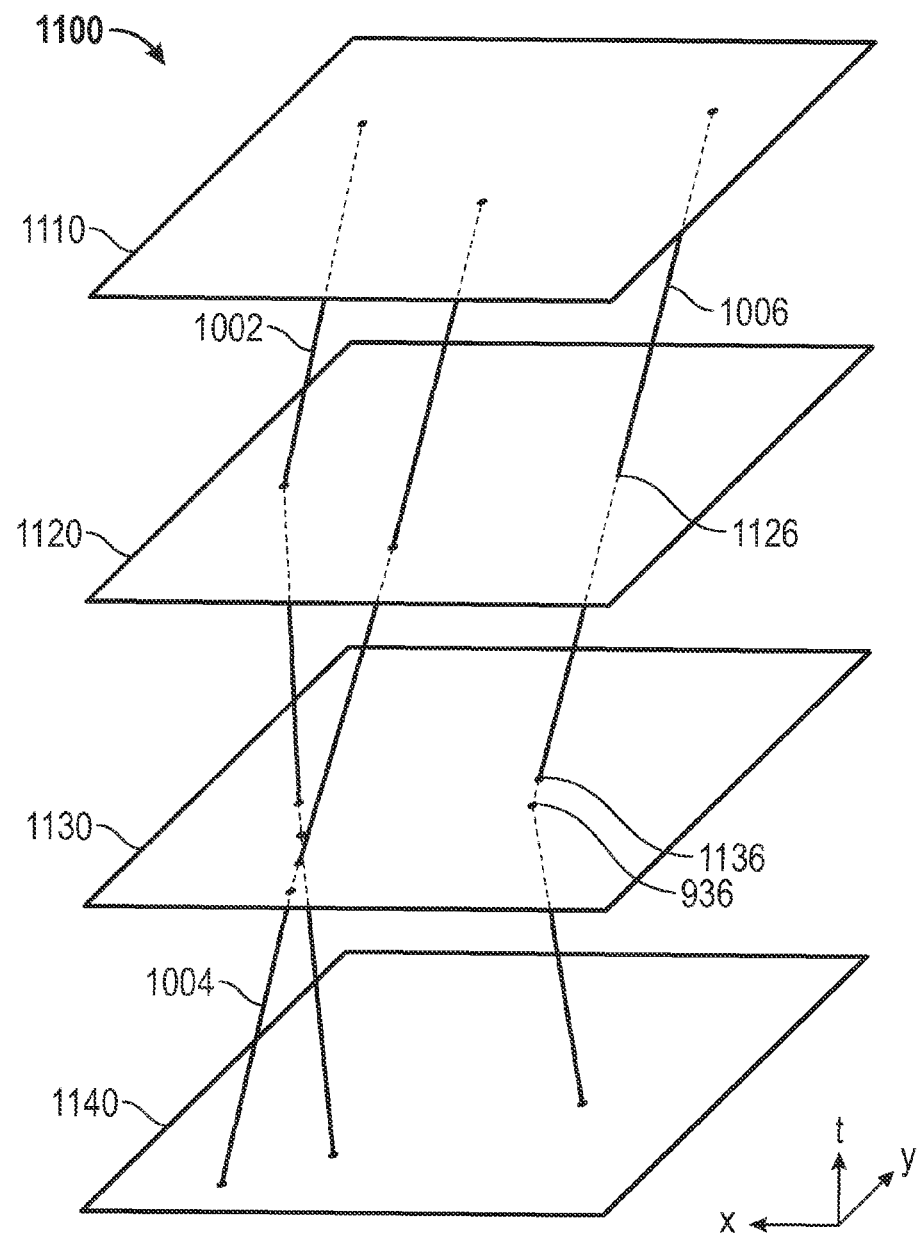

FIGS. 9 to 11 are illustrations of generating three-dimensional objects to model time varying Cartesian data according to certain aspects of the invention. Planes 910, 920, 930, and 940 represent time values for which data has been collected. Plane 930 is slightly offset along the t axis in FIG. 9 (i.e., closer to plane 940 than plane 920), representing a slight offset in a time that the data in that plane was collected.

Each plane contains data points. Points 912, 922, 932, and 942 can correspond to a first item of interest, for example one car or person in a set of cars or people. Likewise, points 914, 924, 934, and 944 can correspond to another item, and points 916, 936, and 946 to yet another item. The last item does not have a corresponding point in plane 920. The lack of a point in the plane represents missing data. The positions of the points correspond to locations associated with the data, for example geographic locations.

In FIG. 10, points corresponding to an item are connected with a line to form an object that traverses the three-dimensional space. Thus, lines 1002, 1004, and 1006 have been mapped into this three-dimensional space. Different techniques for generating these objects can be used. According to a first technique, the three-dimensional object can be generated by mapping each data point in the series of data points to one of a series of two-dimensional shapes and layering the series of two-dimensional shapes in a volume to construct the three-dimensional object. According to another technique, the three-dimensional object can be generated by interpolating between successive data points in a series of data points to form a line in three-dimensional space. Other techniques can be used.

FIG. 11 shows the objects intersected by planes 1110, 1120, 1130, and 1140 at four time intervals, for example for rendering purposes. Uniform time intervals are show but are not required. Plane 1130 is shown at a slightly different time than plane 930 in FIG. 10, illustrating that the objects can be used to model data at different times and offsets than included in the collected data. Rendering of point 1136 at the intersection between plane 1130 and line 1006 may be offset from collected data point 936, but for purposes of animation this difference may be acceptable. Likewise, point 1126 in line 1006 can be rendered even though no data directly corresponded to this point in the collected data. The ability to enable rendering of points 1136 and 1126 illustrates how the disclosed techniques can be used to compensate for missing data points and temporal misalignments within the data.

Figure 12:
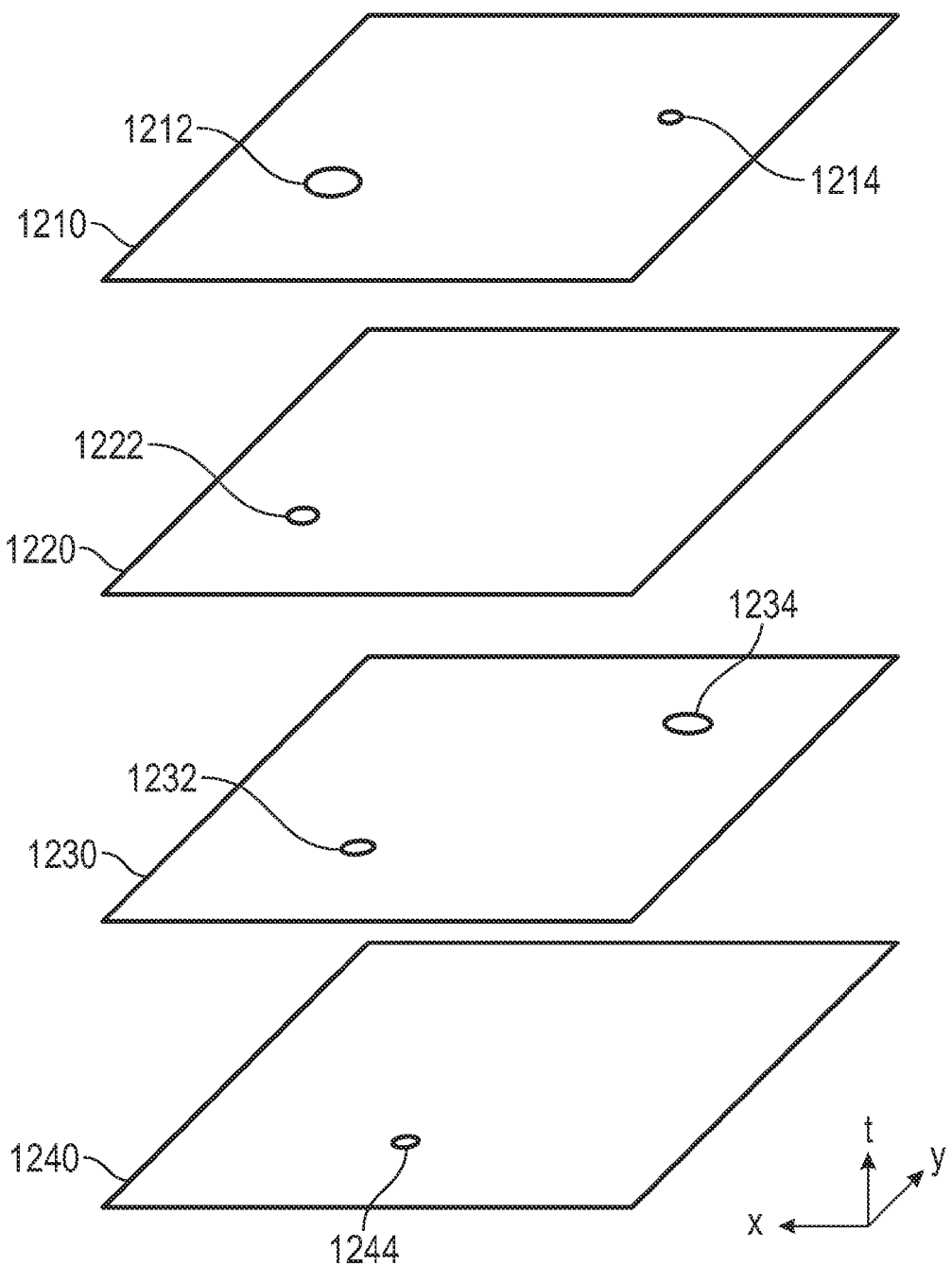
FIGS. 12 to 14 are illustrations of generating three-dimensional objects to model time varying Cartesian data according to certain aspects of the invention.
Figure 13:
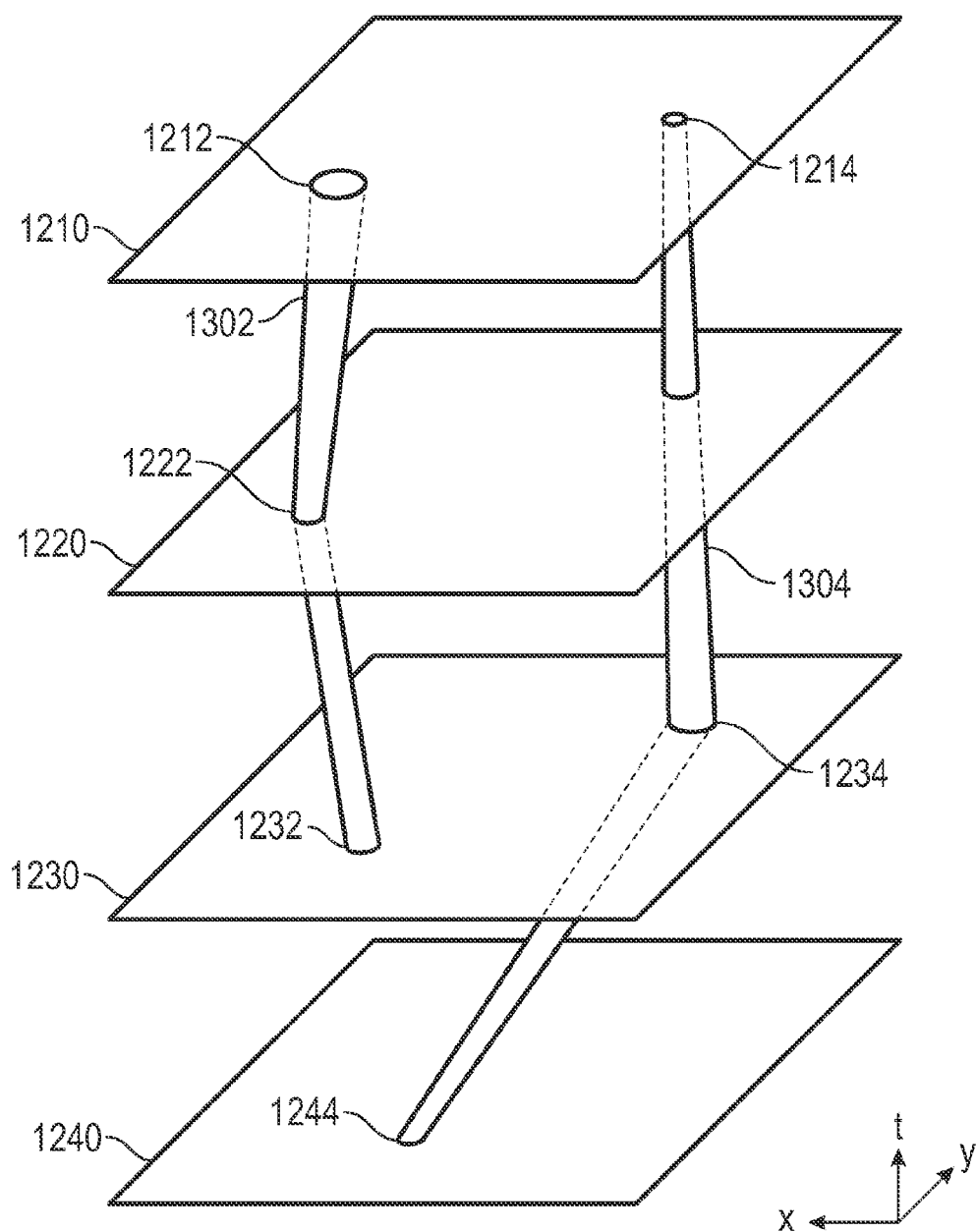
Figure 14:
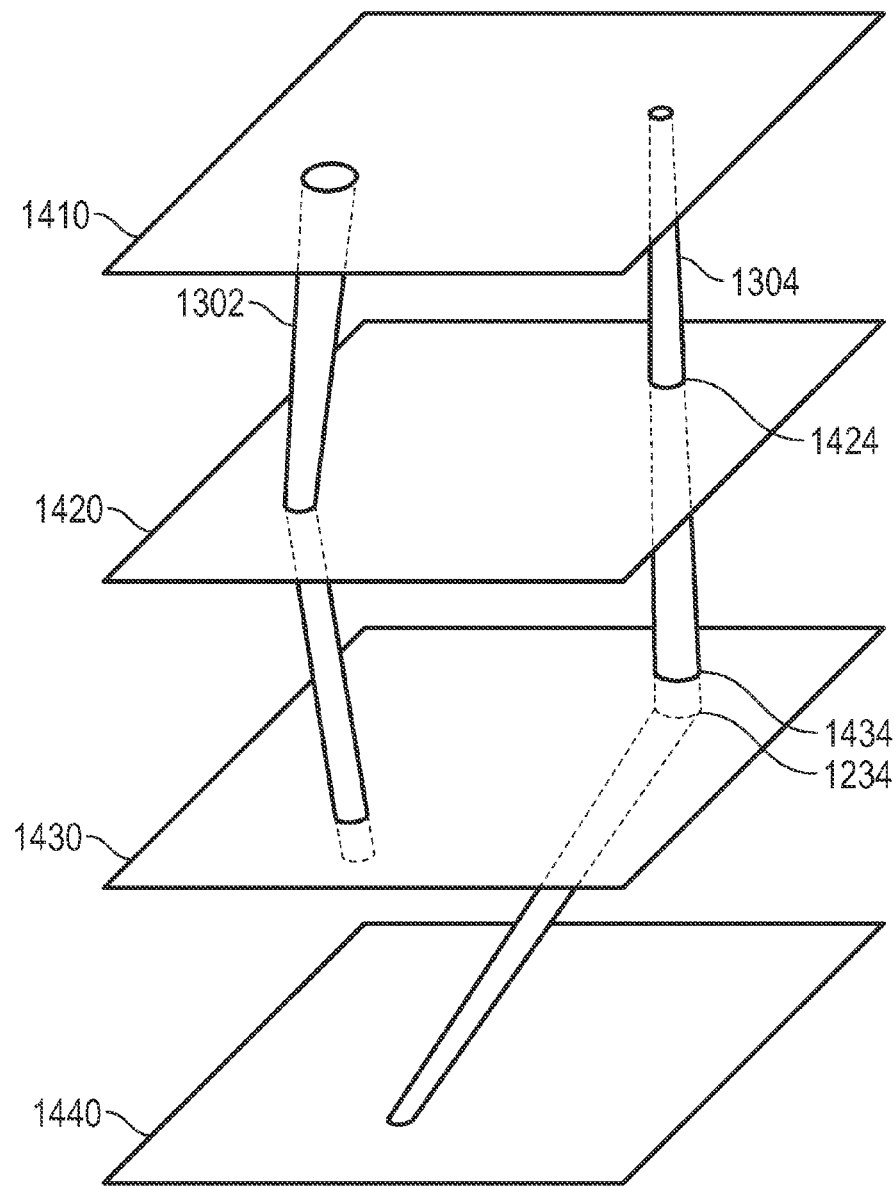

FIGS. 12 to 14 are illustrations of generating three-dimensional objects to model time varying Cartesian data according to certain aspects of the invention.

Planes 1210, 1220, 1230, and 1240 represent time values for which data has been collected. Plane 1230 is slightly offset along the t axis in FIG. 12 (i.e., closer to plane 1240 than plane 1220), representing a slight offset in a time that the data in that plane was collected.

Each plane contains shapes representing time varying data. Shapes 1212, 1222, and 1232 can correspond to a first item of interest. Likewise, shapes 1214, 1234, and 1244 can correspond to another item. The last item does not have a corresponding shape in plane 1220. The lack of a shape in the plane represents missing data. The positions of the shapes correspond to locations associated with the data, for example geographic locations. The sizes of the shapes correspond to some other item of time and location varying data, for example a speed of the item at each place and time.

In FIG. 13, shapes corresponding to an item are connected with surfaces that traverse a three-dimensional space. Thus, objects 1302 and 1304 have been mapped into this three-dimensional space. One technique for generating the objects includes interpolating a surface between successive shapes in a series of shapes to form the three-dimensional object. Other techniques can be used.

FIG. 14 shows the objects intersected by planes 1410, 1420, 1430, and 1440 at four time intervals, for example for rendering purposes. Uniform time intervals are show but are not required. Plane 1430 is shown at a slightly different time than plane 1330 in FIG. 13, illustrating that the objects can be used to model data at different times and offsets than included in the collected data. Rendering of shape 1434 at the intersection between plane 1430 and object 1304 may be offset from collected data shape 1234, but for purposes of animation this difference may be acceptable. Likewise, shape 1424 in object 1304 can be rendered even though no data directly corresponded to this shape in the collected data. The ability to enable rendering of shapes 1434 and 1424 illustrates how the disclosed techniques can be used to compensate for missing data points and temporal misalignments within the data.

The foregoing modeling techniques are not limited to modeling data regarding physical objects. For example, the objects can be used to model seismographic data over a geography. Other types of data also can be modeled.

Figure 15:
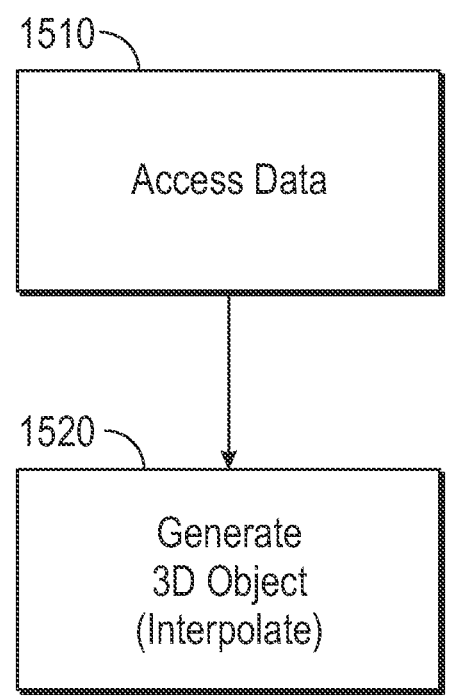
FIG. 15 is a flowchart illustrating a method of generating three-dimensional objects to model time varying Cartesian data according to certain aspects of the invention.

FIG. 15 is a flowchart illustrating a method of generating three-dimensional objects to model time varying Cartesian data according to certain aspects of the invention.

Briefly, a computing device such as those shown in FIGS. 1 and 2 can be configured to provide time-varying geographic data to be rendered on a map, for example as discussed above with respect to FIGS. 9 to 14. One technique of doing so includes configuring a computing device's processing hardware to access, from the memory device, data defining a series of data points that vary over a time interval, the series of data points associated with a series of geographic coordinates, and to generate a three-dimensional object having a profile along an axis, the profile varying along the axis based on the series of data points.

Thus, in step 1510, data defining a series of data points that vary over a time interval are accessed. These data points can be used to generate a three-dimensional object in step 1520. Alternatively, multiple three-dimensional objects can be generated, for example as illustrated in FIGS. 9 to 14. In different approaches, the three-dimensional object(s) can be generated and/or augmented on a client, pre-constructed on a server, or generated, augmented, and/or pre-constructed on any other computing device.

One possible advantage of the modeling techniques disclosed above is that objects modeling time varying Cartesian data can be loaded once and then used to render multiple views and animations of time varying data. Thus, constant processing of data points and CPU load can be reduced. Furthermore, graphics cards such as graphics card 219 in FIG. 2 tend to be well suited to performing calculations required for generating and rendering images of three-dimensional objects, which can further enhance performance. The disclosed techniques are not limited to implementations that achieve these advantages.

The foregoing disclosure includes a description of techniques implemented using a computing device. These techniques also can be implemented as a computer implemented method, as instructions stored on machine-readable storage medium or computer readable medium, and in other forms.

Furthermore, various aspects of the subject matter described in this disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this disclosure, or any combination of one or more such back end, middleware, or front end components. The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computing device can be a client, a server, or both a client and a server (i.e., self-serving). A client and server are generally but not necessarily remote from each other and can interact through a communication network. The relationship of client and server arises by virtue of computer programs running on the respective computers and having a client-server relationship to each other. A computing device used to implement the disclosed techniques can be, for example, and without limitation, a desktop computer, laptop computer, or tablet computer. The computing device can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to a medium or media that can store data and instructions for execution by processing hardware. Such a medium may take many forms, including, but not limited to, non-volatile media and volatile media. Non-volatile media include, for example, optical or magnetic disks. Volatile media include dynamic memory.

Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described in this disclosure can be implemented as instructions stored by such machine-readable storage media, computer readable media, or other storage or memory.

While this disclosure contains many specifics, these should not be construed as limitations on the scope of what may be claimed, but rather as descriptions of particular implementations of the subject matter. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this disclosure has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computing device configured to render time-varying geographic data on a map, the computing device comprising:
   a memory device, and
   processing hardware configured to:
      access, from the memory device, data defining a three-dimensional object representing time-varying geographic data, the three-dimensional object defined in a three-dimensional coordinate space, the geographic data including at least one variable that varies in magnitude at a time-varying location in the coordinate space,
      determine a two-dimensional plane in the three-dimensional coordinate space, the two-dimensional plane corresponding to a time value of interest,
      intersect the three-dimensional object with the two-dimensional plane to define a shape, and
      render, on the map, the shape defined by the intersection of the two-dimensional plane with the three-dimensional object to illustrate a location on the map and a magnitude of the variable corresponding to the time value of interest.

2. The computing device of claim 1, wherein the processing hardware is configured to provide an animation of the time-varying geographic data by rendering a series of shapes on the map, the series of shapes defined by an intersection of the three-dimensional object with a series of two-dimensional planes, each two-dimensional plane corresponding to a successive time value of interest.

3. The computing device of claim 2, wherein colors of at least some of the shapes correspond to the time-varying geographic data.

4. The computing device of claim 1, wherein the processing hardware is further configured to:
   access data defining a plurality of different three-dimensional objects, and
   render a plurality of shapes on the map, each shape defined by the intersection of the two-dimensional plane with one of the plurality of three-dimensional objects.

5. The computing device of claim 1, wherein the three-dimensional coordinate space comprises two dimensions mapped to a geographic area and a third dimension mapped to time, the two-dimensional plane laying in the third dimension.

6. A computer implemented method of rendering time-varying geographic data on a map, the method comprising the steps of:
   accessing, by processing hardware, data defining a plurality of three-dimensional objects representing time-varying geographic data, the three-dimensional objects defined in a three-dimensional coordinate space, the geographic data including at least one variable that varies in magnitude at a time-varying location in the coordinate space;
   determining a two-dimensional plane in the three-dimensional coordinate space, the two-dimensional plane corresponding to a time value of interest;
   intersecting the three-dimensional objects with the two-dimensional plane to define a plurality of shapes; and
   rendering, on the map, the plurality of shapes defined by the intersection of the two-dimensional plane with the three-dimensional objects to illustrate one or more time-varying locations on the map and a magnitude of at least one variable corresponding to the time value of interest.

7. The computer implemented method of claim 6, further comprising the step of providing an animation of the time-varying geographic data by rendering a series of shapes on the map, the series of shapes defined by an intersection of the three-dimensional objects with a series of two-dimensional planes, each two-dimensional plane corresponding to a successive time value of interest.

8. The computer implemented method of claim 7, wherein sizes of at least some of the shapes correspond to the time-varying geographic data.

9. The computer implemented method of claim 7, wherein colors of at least some of the shapes correspond to the time-varying geographic data.

10. The computer implemented method of claim 6, wherein the three-dimensional coordinate space comprises two dimensions mapped to a geographic area and a third dimension mapped to time, the two-dimensional plane laying in the third dimension.

11. A computer implemented method of providing time-varying geographic data to be rendered on a map, the method comprising the steps of:
    accessing, by a computing device, data defining a plurality of series of data points that vary in magnitude and location in a coordinate space over a time interval, the plurality of series of data points associated with a series of geographic coordinates,
    generating, by processing hardware, a plurality of three-dimensional objects having a plurality of profiles along an axis, the plurality of profiles varying in magnitude at a time-varying location with respect to the axis based on the plurality of series of data points, and
    rendering the three-dimensional objects in a three-dimensional coordinate space.

12. The computer implemented method of claim 11, wherein generating the three-dimensional objects comprises mapping each data point in each series of data points to one of a series of two-dimensional shapes and layering the series of two-dimensional shapes in a volume to construct the three-dimensional objects.

13. The computer implemented method of claim 11, wherein generating the three-dimensional objects comprises interpolating between successive data points in each series of data points to form a plurality of lines in three-dimensional space.

14. The computer implemented method of claim 11, wherein generating the three-dimensional objects comprises:
    generating a plurality of series of shapes, one shape for each data point in each series of data points; and
    interpolating a surface between successive shapes in each series of shapes to form the three-dimensional objects.

15. The computer implemented method of claim 11, further comprising the step of providing the three-dimensional objects to a client device in response to a request from the client device for the time-varying geographic data in an area comprising the geographic coordinates.

16. A non-transitory machine-readable storage medium comprising machine-readable instructions for causing a processor to execute a method of providing time-varying Cartesian data to be rendered, the method comprising the steps of:
    accessing data defining a plurality of series of data points that vary in magnitude and location in a coordinate space over a time interval, the plurality of series of data points associated with a series of Cartesian coordinates, generating a plurality of three-dimensional objects having a plurality of profiles along an axis, the plurality of profiles varying in magnitude and location with respect to the axis based on the plurality of series of data points, and rendering the three-dimensional objects in a three-dimensional coordinate space.

17. The non-transitory machine-readable storage medium of claim 16, wherein generating the three-dimensional objects comprises mapping each data point in each series of data points to one of a series of two-dimensional shapes and layering the series of two-dimensional shapes in a volume to construct the three-dimensional objects.

18. The non-transitory machine-readable storage medium of claim 16, wherein generating the three-dimensional objects comprises interpolating between successive data points in each series of data points to form a plurality of lines in three-dimensional space.

19. The non-transitory machine-readable storage medium of claim 16, wherein generating the three-dimensional objects comprises:

generating a plurality of series of shapes, one shape for each data point in each series of data points; and interpolating a surface between successive shapes in each series of shapes to form the three-dimensional objects.

\* \* \* \* \*